July 3, 1956  O. F. CARLSON  2,753,120
CONTROL FOR HOT WATER HEATING SYSTEM
Filed Sept. 21, 1951  3 Sheets-Sheet 2
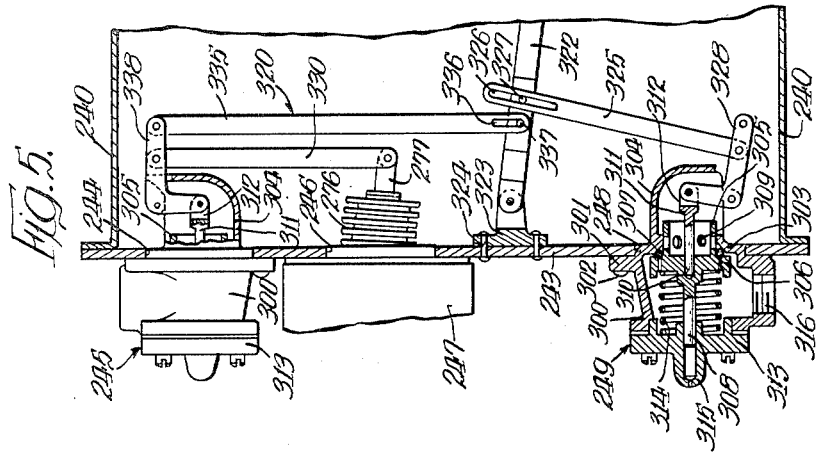
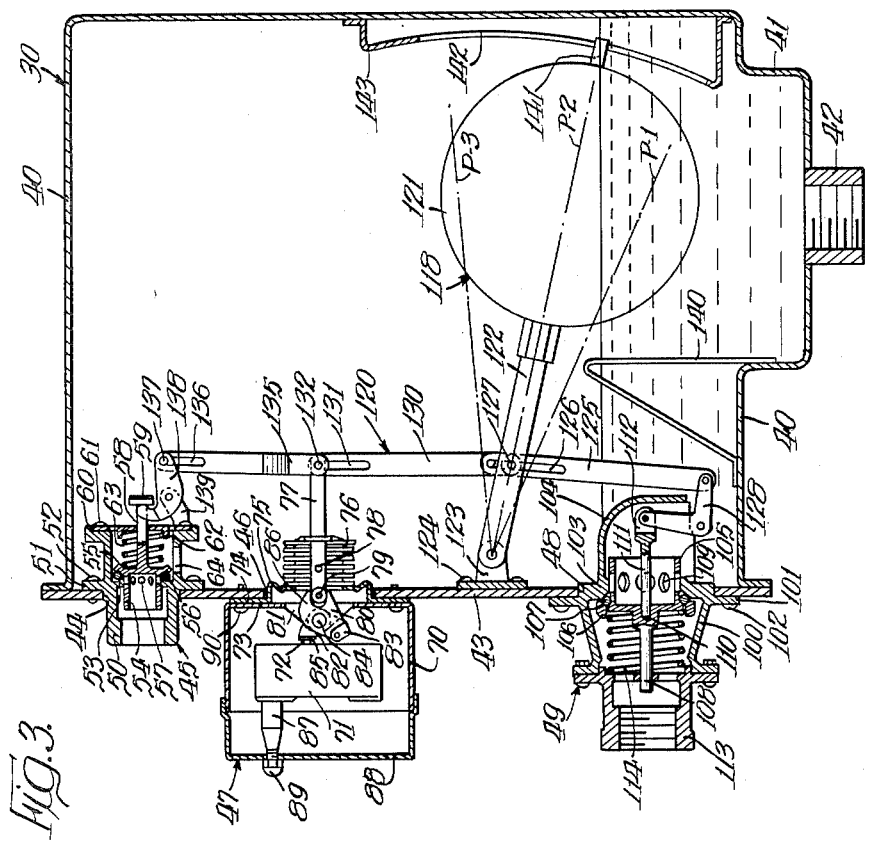
INVENTOR.
Oscar F. Carlson
BY
Attys:

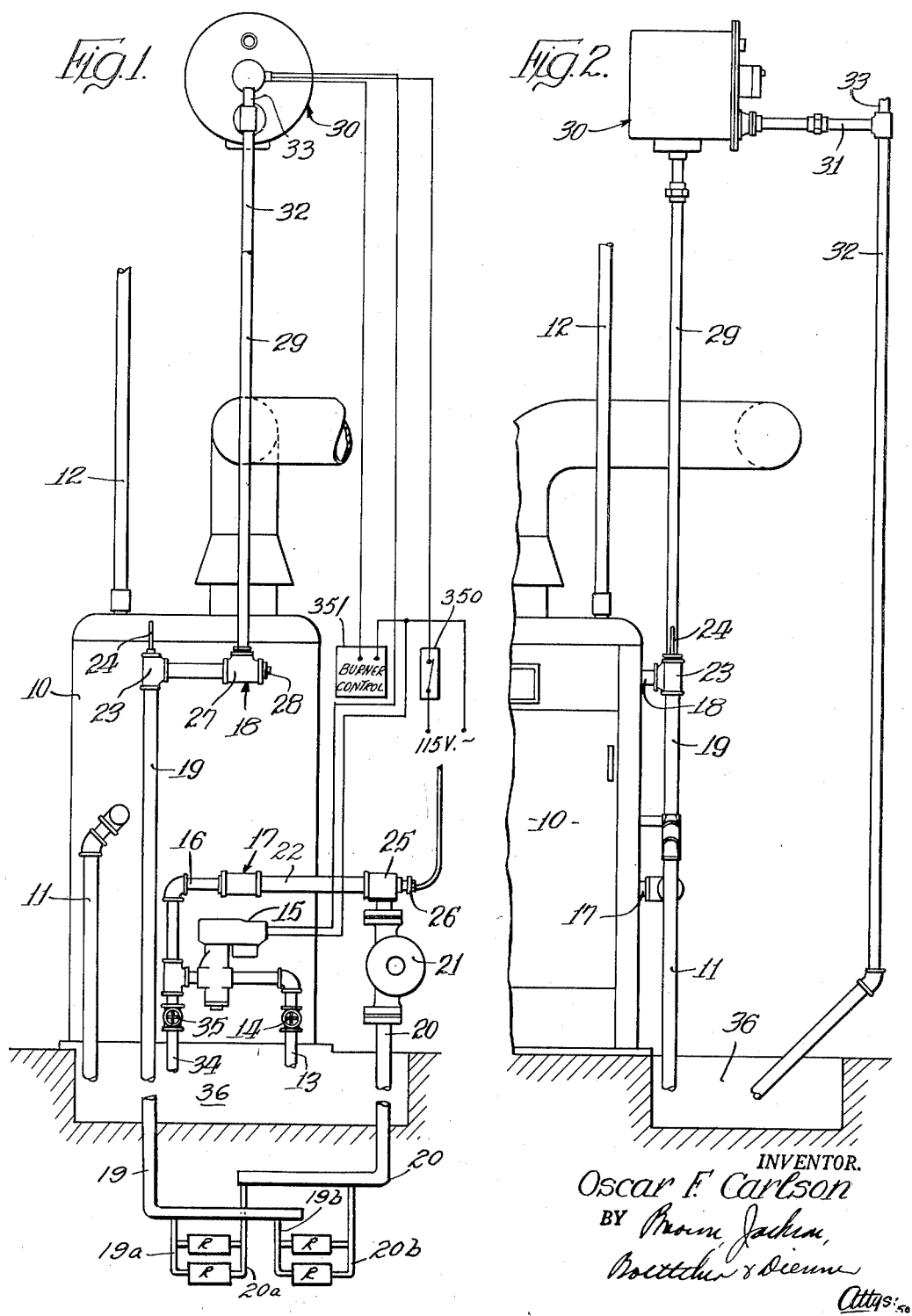

July 3, 1956  O. F. CARLSON  2,753,120
CONTROL FOR HOT WATER HEATING SYSTEM
Filed Sept. 21, 1951  3 Sheets-Sheet 3

INVENTOR.
Oscar F. Carlson
BY Brown, Jackson,
Boettcher & Dienner
Attys.

United States Patent Office 2,753,120
Patented July 3, 1956

2,753,120

CONTROL FOR HOT WATER HEATING SYSTEM

Oscar F. Carlson, Evanston, Ill., assignor to Oscar F. Carlson Company, Chicago, Ill., a corporation of Illinois Application September 21, 1951, Serial No. 247,734

10 Claims. (Cl. 237—8)

The present invention relates to controls for water heaters, hot water heating systems, and the like, and particularly to automatic means for controlling the pressure and water level in hot water heating systems and for controlling operation of the boiler or furnace of the system according to the water level in the system.

In the past, the water level in hot water heating systems has been controlled manually and no provision has been made for controlling the boiler in accordance with the water level in the system, except as could be effected by visual observation and manual adjustment. Various proposals have been made to provide controls for maintaining a constant water level in heating systems, other controls for discontinuing boiler operation upon occurrence of a low water level condition, and safety relief valves for relieving the system of pressures above a predetermined maximum. The controls, however, were separate of one another and separately performed their intended functions. Accordingly, one control medium could be rendered inoperative without affecting the others, so that operation of the system could continue despite the occurrence of undesirable conditions.

An object of the present invention is to provide completely automatic and correlated means for controlling the water pressure in the system, for controlling the water level in the system and for controlling operation of the boiler in accordance with the water level.

Hot water heating systems generally include a boiler, a plurality of heat exchangers or radiators and a combination reservoir and expansion or compression tank located at the highest point in the system. The present invention is particularly directed to a novel expansion tank having control means therein for effecting the various correlated controls stated hereinbefore.

It is an object of the present invention to provide improved expansion or surge tanks for hot water heating systems, the tank containing pressure and water level responsive means for controlling pressure and liquid level in the system and for effecting further control of the system in response to variations in water level.

Heretofore, lack of correlated controls between water level and pressure and furnace operations has resulted in serious damage and injury due to overheating, flash evaporation of water, creation of steam pressure in the system and the like. An object of the present invention is to provide correlated control means for heating systems wherein development of pressures above a desired or optimum pressure will be automatically relieved, the operation of the furnace automatically discontinued and the system automatically restored to optimum conditions, upon the occurrence of which, operation of the furnace is automatically resumed.

A further object of the invention is to provide correlated control means for heating systems wherein variations in water level beyond optimum and well defined limits is automatically compensated for and wherein decrease in water level below an optimum limit results in discontinuation of operation of the furnace so that the furnace cannot be operated unless the same be filled with water.

Another object of the invention is to provide means for automatically establishing a pressure head of predetermined magnitude in the system in addition to the water level pressure head and means for relieving the pressure head when same exceeds said predetermined magnitude.

It is also an object of the invention to provide an improved hot water heating system that is completely automatic in operation and requires no manual adjustment to maintain given spaces at a given temperature.

In carrying out the foregoing objects of the invention, I provide a hot water heating sytsem including heat exchangers or radiators, which may be located in the floor, wall, or ceiling of spaces to be heated, a conventional automatic furnace or boiler, such preferably as an automatic gas or oil fired boiler, and a surge or pressure tank of the novel features hereinbefore stated constituting the highest point in the system. The surge or expansion tank includes an automatic overflow and pressure relief valve, switch means for effecting control of raw water feed and boiler operation, air valve means and float means for effecting actuation of the valves and switch means. In one embodiment of the invention the valves and switch means are controlled by a single float while in another embodiment the overflow and pressure relief valve is controlled by a separate float. A further embodiment of the invention is a modification of the said one embodiment.

The present invention provides the advantages, in addition to others, of complete safety and automatic operation.

Further objects of the invention are to provide a compact and economically manufactured surge tank including the control mediums defined hereinbefore, to provide an improved automatic water heating system and to provide control means for insuring automatic and safe operation of water heating systems to positively avoid dangerous situations or conditions that have previously existed.

Other objects and advantages of the present invention will become apparent in the following detailed description of preferred embodiments of the invention, wherein reference is made to the accompanying drawings, in which:

Figure 1 is a side elevation of the boiler and associated apparatus of the water heating system of the present invention;

Figure 2 is a partial front elevation of the apparatus shown in Figure 1;

Figure 3 is a vertical longitudinal cross-sectional view, on an enlarged scale, of one embodiment of the surge or expansion tank of the present invention;

Figure 5 is a fragmentary vertical longitudinal cross-sectional view of a further embodiment of the expansion tank of the present invention.

Figure 4:
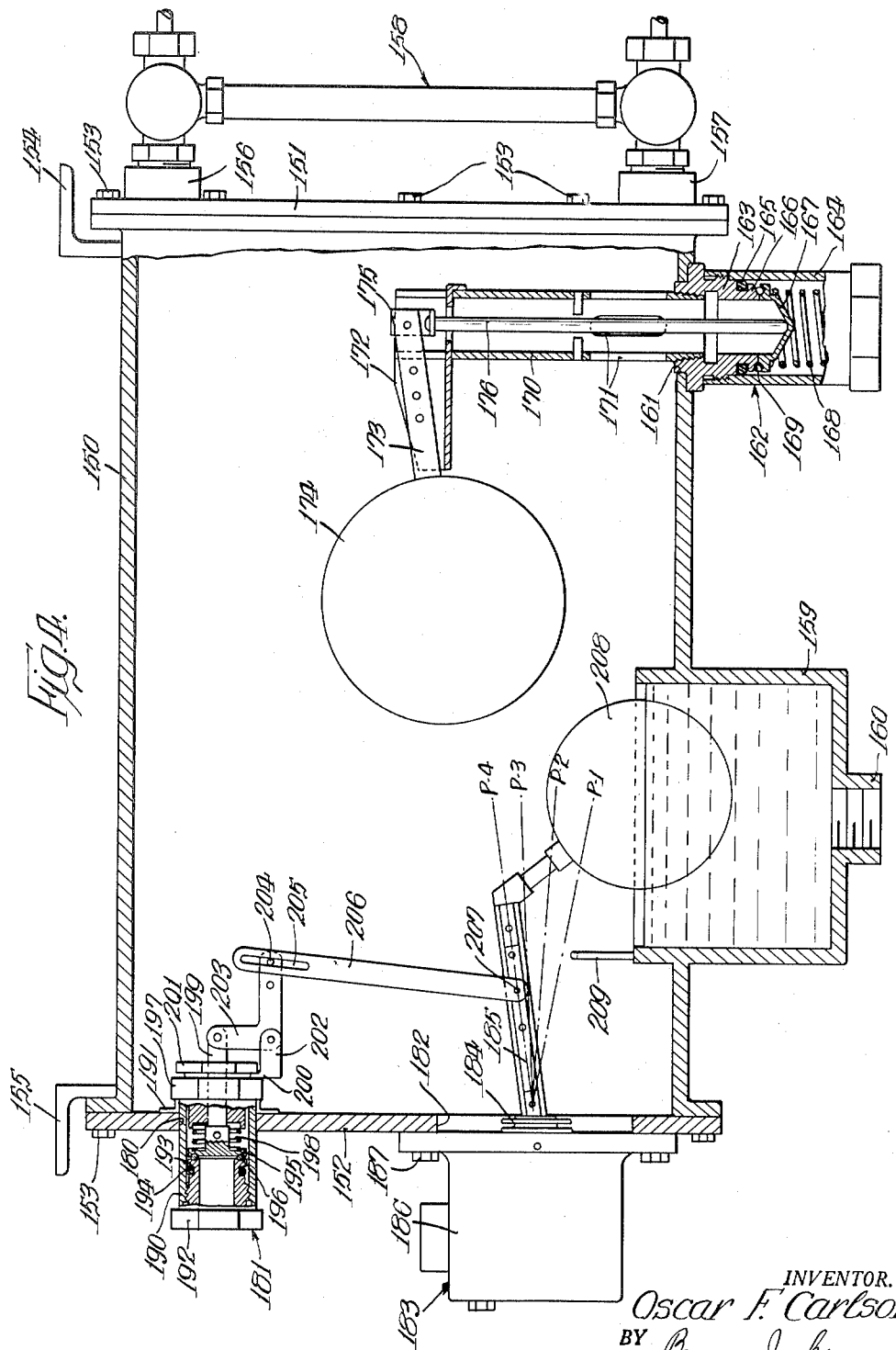
Figure 4 is a vertical longitudinal cross-sectional view of another embodiment of the expansion tank of the present invention.

Referring now to the drawings and particularly to Figures 1 and 2, the water heating system of the present invention includes a furnace 10 of conventional design, preferably a gas fired boiler. The furnace 10 is provided with a first fuel inlet line 11 for low pressure petroleum gas and a second fuel inlet line 12 for high pressure purified gas. The fuel lines 11 and 12 are adapted for use alternately according to the type of gas available. A pipe 13 constitutes the water inlet line and is provided with a manually operable valve 14 for controlling flow of water through the pipe 13. A feeder 15, in the form of a solenoid valve, is interposed in the water inlet line 13 and has its outlet communicating with a pipe 16 leading to the furnace inlet 17. The inlet 17 communicates directly with the furnace heat exchanger which is provided with an outlet 18 communicating with a pipe 19. The pipe 19 constitutes a conduit for conducting heated water to the radiators or heat exchangers of the heating system. The radiators, indicated at R, may be of various types, such as conventional radiators positioned on the floor of the rooms to be heated adjacent the walls thereof, or may be radiant heat exchangers of the type comprising coils of pipe laid in the floor, wall, or ceiling of the space to be heated. The particular type of radiators to be utilized in the system is of no particular import to the present invention. The radiators in the heating system may suitably be connected to the pipe or main 19 by conduit means 19a and 19b, and communicate directly with a return pipe 20 by means of suitable return conduit means 20a and 20b. A circulating pump 21 is interposed in the return pipe 20 and has its outlet in direct communication with a pipe 22 leading to the furnace inlet 17. The pump 21 is adapted to circulate heated water through the furnace heat exchanger, the pipe 19, the radiators of the system and the return line 20.

A T connector 23 is provided between the furnace outlet 18 and the pipe 19 and has one of its connections provided with a fitting adapted for the reception of a thermometer 24. The thermometer 24 provides a visual indication of the heat of the water leaving the furnace heat exchanger when it is desired to check the operation of the furnace and the system. A similar T connector 25 is provided between the outlet of the circulating pump 21 and the pipe 22 and has one of its connections provided in a similar manner with a fitting adapted for the reception of a thermostat bulb 26. Means are provided for establishing communication between the thermostat bulb 26 and a suitable remote indicator or control device which may be located within the space to be heated, as desired. A connector 27 is provided at the furnace outlet 18 for establishing connection between the outlet 18 and the pipe 19. At one end, the connector 27 is provided with a plug 28 adapted to be removed to facilitate cleaning and inspection of the furnace outlet 18. A vertically extending pipe 29 is connected at its lower end to the connector 27 in communication with the furnace outlet 18 and extends upwardly and is connected at its upper end to a surge or expansion tank, indicated generally at 30.

The expansion tank 30 is positioned at the highest point in the heating system and, depending upon the arrangement of the radiators in the system, may be disposed a few feet above the furnace or a substantial distance above the furnace, so long as the tank constitutes the highest point in the system. The tank 30 is provided with an outlet to which a connecting pipe 31 is threaded for conducting fluid from the tank to a drain pipe 32. The drain pipe is provided with an upwardly extending projection or continuation 33 adapted to prevent syphoning action in the drain pipe 32.

A drain pipe 34 communicates with the outlet of the feeder 15 and is provided with a manually adjustable valve 35 for controlling flow of water therethrough. The valve 14 in the water inlet line 13 is normally opened and the valve 35 in the drain pipe 34 is normally closed. However, should it become desirable to drain the heating system of water for any particular purpose, the inlet valve 14 may be closed and the drain valve 35 opened to accommodate drainage of the water in the system through the pipe 34. The pipes 11, 13, 19, 32 and 34 extend into a pit 36 and are adapted to be provided therein with suitable valves and the like for controlling flow through the various pipes. Regulations relating to the use of gas as a fuel permit passage of low pressure petroleum gas through valve pits, such as the pit 36, but do not permit the passage of inlet pipes for high pressure purified gas through such a pit. Therefore, the pipe 11 is shown as extending through the pit 36, while the pipe 12 does not.

In use, the drain valve 35 is closed and the inlet valve 14 is opened so that water may flow through the pipe 13 under the control of valve 15 to all of the radiators in the system, the heat exchanger of the furnace, the pipe 29 and to establish a definite desired water level within the expansion tank 30. The system thus far described is of no particular novelty and is well known. The boiler 12 is operated under the control of various conventional devices, as will be described hereinafter with respect to the reference numerals 350 and 351, to heat the water within the heat exchanger thereof and the heated water is circulated throughout the system, or that portion consisting of the furnace heat exchanger and the radiators, to heat the spaces within which the radiators are positioned, the circulation of water throughout the system being accomplished by operation of the circulating pump 21.

In conventional systems, such as that thus far described, a sight tube gauge is usually placed upon the expansion tank, which tank is normally of considerably greater size than that shown in the drawings, and the operator of the system must continuously take readings on the sight gauge to determine the correctness of the liquid level within the system. If the liquid level falls below a desired or minimum level, means must be manually set in motion to effect actuation of the feeder 15 to accommodate entry of additional water into the system until the water is brought to the desired level. Should the operator be lax in keeping constant check upon the level of water within the system, the water may expand, for example, as it is heated, to rise above a desired level and overflow the expansion tank or create a considerable and undesirable pressure head upon the system. Such undesirable conditions can readily lead to destruction of property and to the inefficient operation of the heating system. Also, water within the system may evaporate so that the water falls below the desired level to remove the pressure head from the system. Furthermore, the water level may drop to such an extent that the heat exchanger of the boiler is not entirely filled with water, in which case the furnace will become over-heated while the room space will not be heated. Upon occurrence of such situation, the operator of the heating system may have the intelligence to add water to the system by opening the control valve 15. However, the water level may have dropped to such an extent that certain surfaces of the heat exchanger in the boiler have not been subjected to the cooling effect of water therein and have become overheated to such an extent that as cold water is added to the system, flash evaporation thereof will occur resulting in an explosion and consequent property damage and possible physical harm. The present invention is particularly directed to overcoming the disadvantages of conventional heating systems and to prevent the occurrence of such disastrous results as pointed out. To this end, the present invention provides novel controls embodied in a novel surge or expansion tank, such as those shown in Figures 3 to 5.

Referring now to Figure 3, the surge or expansion tank of the present invention is shown as including a cylindrical cup-like shell or casing 40 having an integral offset portion 41 provided with a fitting 42 adapted for the reception of the pipe 29 and constituting the inlet to the tank. The tank is provided with an end plate 43 suitably secured, as by welding, to the flanged open end of the shell 40. The end plate 43 is provided with a number of apertures along the vertical diameter thereof. The apertures include an upper aperture 44 adapted for the reception of an air valve 45, an aperture 46 at the central portion of the end plate 43 adapted for the reception of a switch mechanism 47 and an aperture 48 at the lower portion of the end plate 43 adapted for the reception of a combination pressure relief and overflow valve 49.

The air valve 45 comprises a tubular body 50 having a radially extending external flange 51 by means of which the valve 45 is secured to the end plate 43, as by means of rivets 52 or the like extending through the flange and the end plate. The valve body 50 is provided with an internal radial flange 53 forming a valve seat. The valve seat formed by the flange 53 is inclined inwardly toward the interior of the tank 30. A cylindrical valve member 54 is slidably received within the body 50 and engages the interior surfaces of the flange 53. The valve member 54 is provided with an external radial flange 55 which extends outwardly to overlie the flange 53 on the body 50. In the face thereof opposed to the inclined surface of the flange 53, the flange 55 is provided with an annular groove, having a cross sectional configuration in the form of a V, adapted for the reception of a resilient O ring 56. The flange 55 on the valve member 54 is adapted to be moved toward the inclined surface of the flange 53 to cause intimate engagement between the two flanges and the O ring 56 to provide a seal for the port defined by the flange 53 on the body member 50. A plurality of radial holes 57 are provided in the wall of the cylindrical portion of the valve member 54 to establish communication between the two sides of the flange 53 of the body member 50 when the valve member is moved to space the radial flange 55 from its seat. The valve member 54 is provided with an integral stem 58 extending into the interior of the shell 40 and provided at its end with a head 59. A diaphragm 60 extends across the open interior end of the valve body 50 and is suitably secured thereto by means of screws 61. The diaphragm 60 is provided with a central aperture through which the stem 58 extends and by means of which the stem is guided for reciprocal movement. The diaphragm is also provided with projections 62 stamped and bent out of the body thereof, inwardly, to define a seat for one end of a spring 63 which engages the valve 54 to seat same against the flange 53 to normally maintain the valve in closed position. As will be noted, the valve member 54 opens inwardly of the tank. Suitable holes 64 are provided in the wall of the body member 50 to establish communication between the valve port and the interior of the tank.

The switch mechanism 47 is suitably mounted within a cylindrical casing 70, the switch being indicated at 71 and preferably constituting a micro-switch of conventional design having an actuator button 72 extending to the exterior thereof. The casing 70 is provided with an inwardly directed radial flange 73 to which a plate 74 is suitably secured. The plate 74 is turned outwardly as at 75 to project through the aperture 46. A brass Sylphon 76 is sweated to the projecting portion of the plate 74 at one end and at its other end is suitably sweated to an actuator link or rod 77. The actuator link or rod 77 is pivotally mounted as at 78 within the Sylphon 76 and is provided at its end extending into the interior of the casing 70 with a roller 79. As will be apparent, the Sylphon 76 provides a seal to prevent entry of water or other fluids from the tank into the interior of the switch casing 70.

The switch actuator mechanism preferably includes a first lever 80 pivotally mounted on an inturned tab 81 of the flange 73 of the casing 70. A second lever 82 is likewise pivotally mounted on the tab 81, and is pivotally connected to the first lever 80 by means of a tab 83 formed integrally with the lever 80. The two levers 80 and 82 are suitably mounted on a pivot pin 84 which comprises an eccentric adapted to be adjusted to vary the actuating stroke of the levers 80 and 82. The second lever 82 is provided at its free end with tab 85 engaging the actuator button 72 of the switch 71. The first lever 80 is provided with a bifurcated portion 86 at its free end within which the roller 79 is received. Movement of the end of the link or rod 77 extending into the shell 40 in an upward direction about its pivot 78 will effect movement of the bifurcated end of the lever 80 in a downward direction which will cause a corresponding movement of the opposite end of the lever 80 in an upward direction. Accordingly, the end of the lever 82 connected to the lever 80 by means of the tab 83 will be moved upwardly so that the tab 85 on the free end of the lever 82 will be moved away from the actuator button 85 to free the switch so that it may assume a normal position. Movement of the rod 77 in a downward direction will effect actuation of the switch 71 to a position other than its normal position.

A stud 87 is suitably secured within the casing 70 and extends to the exterior thereof for the reception of a cap 88 for closing the open end of the cylindrical casing 70. The cap 88 may be suitably held to the stud 87 by means of a nut 89. The switch mechanism is preferably supported on the end plate 43 by means of screws 90 extending through the radial flange 73 of the casing 70 and through the plate 74 into tapped bores in the end plate 43.

The combination pressure relief and overflow valve 49 includes a generally cylindrical body member 100 provided with an external radial flange 101 by means of which the valve 49 is suitably secured to the end plate 43, as by means of rivets 102 or the like. The body 100 is provided with an internal flange 103 provided with an inclined surface adapted to form a valve seat. The body 100 is also provided with a cap-like portion 104 extending into the interior of the shell 40. A cylindrical valve member 105 is slidably positioned within the body 100 and extends through the port defined by the radial flange 103. The valve member 105 is provided with an integral externally extending radial flange 106, which is provided in its face opposing the inclined surface of the flange 103 with an annular groove having a cross sectional configuration in the form of a V. The groove is adapted for the reception of an O ring seal 107 adapted to be moved into engagement with the inclined surface of the flange 103 to provide a sealed closure. Preferably, a plurality of breather ports are provided in the flange 106 to establish communication between the annular groove and the vertical side of the valve member to insure proper seating of the O ring seal. The valve member 105 is provided with an integral stem 108 extending exteriorly of the shell 40. Suitable holes 109 are provided in the cylindrical portion of the valve member 105 to establish communication between the interior and exterior of the tank when the flange 106 and O ring 107 are moved away from or out of sealing engagement with the inclined surface of the flange 103. A bore 110 is provided within the stem 108 and is adapted to receive a rod 111 mounted for sliding movement within the bore 110. The rod 111 is provided with a bifurcated portion 112 at its outer end for a purpose to be later described. At its exterior end, the body 100 is provided with a flange adapted for the reception of the flanged portion of a fitting 113. The fitting 113 provides a guide for the stem 108 and also provides means for the connection of the pipes 31 and 32 to the expansion tank 30. A compression spring 114 is suitably positioned between the fitting 113 and the valve member 105 to normally urge the valve 105 to its seat 103. As will be noted, the valve 105 opens outwardly of the tank.

The valves 45 and 49 and the switch mechanism 47 are adapted to be actuated by suitable liquid level responsive means in the form of a float 118 and a linkage assembly indicated generally at 120. The float 118 includes a float ball 121 of conventional construction and a rod 122 suitably secured at one end to the float ball 121 and bifurcated at its other end to be pivotally associated with a support 123 suitably affixed to the end plate 43, as by means of screws 124. Intermediate its ends, the rod 122 is pivotally connected by means of a pin and slot lost-motion connection to a link 125. The link 125 is provided with a slot 126 adapted for the reception of a pin 127 which is suitably secured to the rod 122. At its opposite or lower end, the link 125 is pivotally connected to a bell crank 128 which is pivotally mounted on the cap portion 104 of the valve 49. The bell crank 128 is pivotally connected at its opposite end to the bifurcated portion 112 of the rod 111. As will be apparent from the drawings, the slot 126 is so disposed with respect to the rod 122 that the pin 127 will effect upward movement of the link 125 as the liquid level within the tank rises, ultimately to effect actuation, or movement away from its seat, of the valve member 105 through the link 125, the bell crank 128 and the rod 111. The rod 111 being slidably associated with the valve member 105 will not effect actuation thereof except in an opening direction, as is accomplished upon upward movement of the link 125. The relative association of the parts is such that as the liquid level commences to rise above the upper limit of desired water level within the tank, the link 125 will be lifted upwardly by means of the float 121 to effect actuation of the valve 105 and drain the tank of any excess water. Water drained through the valve 49 will be conducted through the pipes 31 and 32 to a suitable point of drainage, as will be understood.

A second link 130 is pivotally mounted at its lower end on the pin 127, and is provided at its upper end with a slot 131 adapted to slidably receive a pin 132 suitably fixed to the end of the switch actuator rod 77. The slot 131 is so disposed in the link 130 as to move the actuator rod 77 downwardly as soon as the water level within the tank drops below an optimum level. As pointed out hereinbefore, downward movement of this end of the actuator rod 77 will effect actuation of the switch to a position other than its normal position. The switch 71 is preferably a double-throw switch having one side thereof suitably connected in conventional manner in an electrical circuit including the solenoid valve 15, so that when the switch 71 is actuated to the position stated by downward movement of the actuator rod 77, the solenoid valve will be opened to accommodate entry of raw feed water to the system. As water enters the system, the fluid level within the tank 30 will be increased effecting upward movement of the float 121 until the link 130 is moved to such position that the switch actuating mechanism is actuated to a position wherein the tab 85 on the lever 82 is positioned free of the actuator button 72 of the switch 71, thus accommodating return of the switch to its normal position, wherein energization of the solenoid valve 15 will be discontinued to cause the cessation of water feed. Accordingly, it will be appreciated that the water level responsive switch mechanism in combination with the solenoid valve 15 provides a control for maintaining a substantially constant liquid level within the system.

As pointed out hereinbefore, it is desirable to continue operation of the furnace or boiler at all times when liquid level within the tank is at or above optimum levels. Accordingly the other side of the switch 71 is suitably connected in a conventional manner in a conventional electrical circuit for controlling operation of the furnace or boiler 10, the arrangement being such that the boiler will be continuously operated when the switch 71 is in its normal position and will be discontinued when the switch 71 is actuated, as pointed out hereinbefore, to effect energization of the solenoid valve 15. Accordingly, it will be appreciated that the switch mechanism further provides, in combination with conventional furnace controls, means for discontinuing operation of the furnace when the water level in the system drops below an optimum condition as will be further pointed out hereinafter in conjunction with reference numerals 350 and 351. Such arrangement prevents inefficient operation of the heating system and completely obviates any danger of overheating of the furnace or heat exchanger therein.

A link 135, bifurcated at its lower portion, is pivotally connected to the pin 132 and is provided at its upper end with a slot 136 adapted to slidably receive a pin 137. The pin 137 is suitably secured to a bell crank 138 which is pivotally supported on tabs 139 turned out of the body of the diaphragm 60. The bell crank 138 is provided at the end thereof opposite the pin 137 with a rounded nose portion adapted to engage the head 59 of the valve stem 58. The slot 136 is so disposed within the link 135, with respect to the bell crank 138, the link 130 and the float 121, that the valve member 54 will be moved to open position as the float moves downwardly upon decrease of the water level within the tank, until, as the float 121 reaches its bottom position, the valve 54 will be opened to vent the tank 30 to atmosphere. A stop member 140 is provided in the lower end of the shell 40 to limit the extent of downward movement of the float 121 to prevent damage to the float.

At the side thereof opposite the connection of the rod 122, the float ball 121 is provided with a rod 141 suitably secured thereto and extending therefrom into a slot 142 provided in a bracket 143 suitably secured to the end wall of the shell 40. The slot 142 in the bracket 143, in cooperation with the rod 141, serves as a guide for the vertical oscillation of the float ball 121, and maintains the float ball 121 in accurate alignment with the linkage 120 to prevent damage to the linkage.

With the surge or expansion tank of the present invention included in the heating system previously described, the operation of the system will be as follows:

Assuming the system completely drained of water and inoperative, the float ball 121 will assume a position indicated by the dot-dash line P–1, wherein the rod 122 will be in engagement with the stop 140. At this position, the links 130 and 135 will be moved to their lowermost positions in which the actuator rod 77 of the switch mechanism 47 will be moved downwardly to move the switching elements to the position wherein the circuit to the solenoid valve 15, through the switch 71, is closed and in which the valve 54 will be moved to open position. The pin 127 will be freely riding within the slot 126 in the link 125, so that the valve 49 is not actuated. If it is then desired to set the heating system in operation, the conventional furnace controls are energized, but the furnace will not commence operation since the circuit thereto through the switch 71 is open. Then, the drain valve 35 is closed and the water inlet valve 14 is opened. Upon that occurrence, water will be fed through the pipes 13, 16, 19, 20 and 29 into and throughout the system until the entire system is filled, and the water rises within the pipe 29 and enters the surge or expansion tank 30. As water enters the tank 30, the float ball 121 will be moved upwardly to a normal desired or optimum position indicated by the dash-dot line P–2. In this position, the link 130 will have then moved upwardly sufficiently to release the actuator rod 77 and the switch 71 to allow the switch to return to its normal position, wherein operation of the boiler will commerce to heat the water in the system. As water enters the surge tank 30 and the float ball moves from the position P–1 to the position P–2, the air vent valve 54 was released upon upward movement of the rods or links 130 and 135 to discontinue venting of the tank 30 to atmosphere. Accordingly, as the water level increases to move the float ball 121 to the position P–2, the air within the tank 30 becomes compressed to establish an added and well defined pressure head on the system in addition to the pressure head established by the water column in the pipe 29 and the tank 30. Accordingly, as the water reaches the level in which the float ball 121 is moved to the position P–2, the admission of water will be discontinued, the furnace will be set in operation, and the valve 45 will be closed to accommodate the creation of a pressure head within the tank 30 by action of the water entering the tank.

Should, for one reason or another, the solenoid valve 15 become stuck, so that water continues to enter the tank 30, the float ball 121 will be moved toward the position P–3. As the water level reaches such height as to move the float ball 121 to the position P-3, the pin 127 on the rod 122 will engage the upper end of the slot 126 in the rod 125 to effect actuation of the valve 49 by means of the link 125, the bell crank 128 and the rod 111 to open the valve and drain off excess water through the fitting 113 and the pipes 31 and 32. Suitable alarm means may be associated with the drain pipes 31 and 32 to warn the operator of the device that the solenoid valve 15 is not operating. The valve 49, the fitting 113 and the pipes 31 and 32 preferably have a greater capacity than the water inlet pipe 13 so that the overflow relief provided by the valve 49 will readily dispose of all excess water within the system, even though the solenoid valve 15 becomes stuck in open position for prolonged periods of time. The overflow relief valve 49 is operable in the manner described to relieve the system of excess water, should the water expand to an undesirable degree during heating thereof.

In addition to the foregoing, the valve 49 provides an automatic pressure blowoff should the pressure within the heating system rise above a desired optimum. For example, should steam be created within the system during the heating of the water therein, the steam will build up an additional pressure head upon the water within the system. Upon the occurrence of pressures in excess of a desired optimum, the pressure within the tank exerted upon the valve 105 will overcome the resilient urge of the spring 114 to move the valve 105 to open position until the undesirable pressure condition within the system is relieved. During relief of pressure, water will be forced from the tank 30 through the valve 49 and the drain pipes 31 and 32, causing water level in the tank to fall below the lower limit of the desirable water level range to effect discontinuation of operation of the furnace. After the pressure condition has been relieved, the solenoid valve 15 will be energized to refill the system with water, upon the occurrence of which the float ball 121 will be moved to the position P-2, wherein the entrance of water will be discontinued and the operation of the boiler will be resumed.

The air valve 45 provides a further control, in that it will act to prevent the creation of a sub-atmospheric condition within the heating system. As the water level within the surge tank 30 decreases, the air pressure head on the water will be relieved, and as the water is further drained from the system, as when the drain valve 34 is opened, there will be a tendency for creation of a vacuum within the system. However, as the float ball 121 approaches the position P-1, the air valve 45 will be opened to vent the system to atmosphere, thereby assuring complete drainage of the system and avoidance of sub-atmospheric pressure conditions within the system.

From the foregoing, it will be apparent that the present invention provides a surge or expansion tank of novel features and having associated therewith water level or float responsive means for effecting five separate controls, namely, the establishment of a pressure head and the prevention of a sub-atmospheric condition, the control of the pressure head, the control of overflow or prevention of excessive water level, the automatic control of the water level within the system and the control of the furnace operation in accordance with the water level in the system. It will also be apparent that the controls are effected in correlated relationship so that positive and safe completely automatic operation of the heating system is insured.

A further embodiment of the present invention is shown in Figure 4, wherein two floats are provided for effecting the controls hereinbefore defined. The embodiment of the invention shown in Figure 4 includes a cylindrical shell 150 having a pair of end plates 151 and 152 suitably connected to the flanged open ends of the cylindrical shell 150 by means of bolts 153 or the like. The cylindrical shell 150 is provided with suitable brackets 154 and 155 for securing the shell to a surface located above the highest point in the heating system. The end plate 151 is provided with a pair of apertured bosses 156 and 157 constituting points of connection to the upper and lower portions of the tank, respectively. A sight gauge 158 has its ends suitably connected to and in communication with the apertured bosses 156 and 157 to provide a visual indication for the level of the liquid within the tank 30. The sight gauge 158 is provided merely as a convenience for making visual observations to determine, if desired, the operation of the heating system. However, it will be appreciated that the sight gauge 158 is not a necessary part of the expansion tank of the present invention, since the tank provides all controls necessary for automatic and safe operation of the heating system.

The cylindrical shell 150 is provided with a cylindrical offset portion 159 which has a threaded inlet 160 adapted for the reception of the vertical pipe 29 constituting the inlet to the expansion tank. A radial hole 161 is provided in the wall of the cylindrical shell 150 adjacent the cylindrical offset 159 and is adapted for the reception of a pressure relief and overflow valve 162.

The valve 162 comprises a cylindrical body 163 suitably secured to the wall of the shell 150 and having a portion extending through the hole 161 into the interior of the shell. A fitting 164 is suitably threaded to the external surfaces of the body 163 and is provided in a customary manner with means establishing connection with the drain pipes 31 and 32. An O ring seal 165 is suitably positioned in a peripheral groove in the body member 163 to seal off the threaded connection between the body 163 and the fitting 164. The body member 163 is provided at its outer end with an inclined valve seat 166. A valve member 167, generally cup-like in configuration and having a V-shaped annular groove in its outer face is positioned within the fitting 164 for movement toward and away from the inclined valve seat 166. A spring 168 is suitably confined between the valve member 167 and the outer end of the fitting 164 to normally urge the valve 167 into engagement with the valve seat 166. An O ring seal 169 is suitably received within the annular groove in the face of the valve member to provide means for sealing the port defined by the body member 163. As will be apparent, the valve member 167 opens outwardly of the tank to provide for automatic pressure relief in much the same manner as does the valve 49 of the previously described embodiment of the surge or expansion tank of the present invention.

A tubular vertical support 170 is suitably secured to the body member 163, as by a threaded connection, and extends upwardly therefrom into the interior of the shell 150. The tubular support 170 is provided with a plurality of holes or slots 171 in its walls to establish communication between the interior of the shell 150 and the interior of the body member 163. A lateral supporting bar 172 is suitably secured to the upper end of the tubular support 170 and provides a pivotal support for a link 173. A float ball 174 is suitably secured to one end of the link 173, the link being pivotally connected at its other end to a U-shaped bracket 175 provided on the upper end of a rod or plunger 176. The rod or plunger 176 is provided at its lower end with a rounded nose portion seating within the cup-like valve member 167. It will be apparent that as liquid level rises within the shell 150, the float ball 174 will be moved upwardly to force the rod 176 downwardly so that the nose thereof will engage the valve member 167 to move the same to an open position against the resilient urge of the spring 168. Accordingly, the valve 162 provides for automatic pressure and overflow relief, as does the valve 49 of the embodiment of the expansion tank previously described.

The end plate 152 of the shell 150 is provided with a first upper aperture 180 adapted for the reception of an air valve 181. A second or lower aperture 182 is also provided in the end plate 152 adapted for the reception of a switch mechanism 183. The switch mechanism 183 is substantially identical to the switch mechanism 47 of the previously described embodiment of the invention, with the exception that the switch itself is of somewhat different construction and operation, as will appear more fully hereinafter. The switch mechanism 183 is provided, as is the switch mechanism previously described, with a sylphon 184 providing a flexible water-tight seal between the interior of the switch mechanism casing and a switch actuator rod 185. The switch mechanism is provided with a flanged casing 186 having bolts 187 extending through the flange of the casing into the end wall 152 to secure the switch mechanism 183 to the end plate. If desired, suitable gasket means may be disposed between the flanged portion of the casing of the switch mechanism and the end plate 152.

The air valve 181 comprises a cylindrical body 190 having an external flange 191 suitably secured to the interior surface of the end plate 152. A fitting 192 is suitably threaded to the cylindrical body 190 of the valve and is provided with an inclined valve seat 193. An O ring seal 194 is disposed within a peripheral groove in the fitting 192 to provide a seal between the body and the fitting, in much the same manner as does the O ring seal 165 of the valve 162. A valve member 195 is slidably positioned within the body 190 for movement toward and away from the valve seat 193. The valve 195 is provided in the surface thereof adapted to engage the valve seat 193, with a V-shaped annular groove adapted for the reception of an O ring seal 196 adapted to provide sealing engagement between the valve seat and the valve member. The cylindrical body 190 of the valve is provided with an end cap 197 at its inner side and a spring 198 is suitably compressed between the end cap 197 and the valve member 195 normally to urge the valve to closed position on its seat 193. The valve member 195 is provided on the surface thereof opposite the surface adapted to engage the valve seat, with a bifurcated portion by means of which the valve member may be pivotally connected to a rod 199 extending through the end cap 197 and into the interior of the tank or shell 150. A bracket 200 is suitably secured to the end cap 197 by means of a nut 201 threaded to the end cap. The bracket 200 is provided with an integral extension 202 providing a pivotal support for a bell crank 203. The bell crank 203 is pivotally connected at one end to the valve actuating rod 199 and is provided at its opposite end with a pin 204 adapted to be slidably received within a slot 205 in a link 206. The link 206 is pivotally connected at its lower end by means of a pin 207 to the switch actuator rod 185 which is provided at its outer end with a float ball 208 adapted to be actuated in accordance with the water level within the shell 152 and within the cylindrical offset portion 159 of the shell. Suitable stop means 209 are provided on the upper edge of the cylindrical offset 159 and are adapted to engage the actuator rod 185 to limit downward movement of the float ball 208 to prevent damage to the float ball.

In operation of the surge or expansion tank shown in Figure 4, the water level is adapted to be maintained at an optimum level adjacent the upper end of the cylindrical offset portion 159 of the shell 150, as is shown in the figure. The float ball 208 is chosen of such size that the same is adapted to enter within the cylindrical offset portion 159 and is adapted to attain a lowermost position indicated by the dash-dot line P–1. The switch mechanism 183 preferably includes a pair of single throw switches, one included in the boiler control circuit and the other in the water feeder circuit. In the position P–1, the actuator rod 185 of the switch mechanism 183 is disposed in such position that the feeder switch is closed to effect energization of the solenoid valve 15 and the boiler control switch is open to discontinue the operation of the furnace. In the same position, the link 206 will be moved to such position that the upper end of the slot 205 will have engaged the pin 204 to pivot the bell crank 203 about its support 202 to move the valve stem 199 inwardly of the shell 150 to open the air valve 181.

Accordingly, the shell 150 will be vented to atmosphere. As water enters the tank through the pipe 29 and the inlet 160, the float ball 208 will be moved upwardly to the position indicated by the dash-dot line P–2. In this position of the float ball, the actuator rod 185 will have been moved to such a position that the link 206 will have been moved upwardly to release the pin 204 and accommodate return movement of the valve 195 to closed position under the urge of the spring 198. Accordingly, as the water level rises, an air pressure head will be created above the water within the cylindrical offset portion 159. Further incremental movement of the float 208 due to the entrance of water into the tank to the position P–3 effects actuation of the switch mechanism to close the boiler control switch and render the furnace operative. In position P–3, the boiler is turned on, the water feed is maintained on and the air valve 181 is maintained in closed position. Further incremental movement of the float 208 under the influence of entering water to position P–4 effects actuation of the switch mechanism 183 to open the solenoid switch to turn the water feed off by de-energizing the solenoid valve 15. In position P–4, which is optimum operating position, the air valve 181 is closed, the water is turned off, and the furnace is in operation. The functions of the switch mechanism 183 will become more readily apparent hereinafter as the furnace controls are described in conjunction with reference numerals 350 and 351.

Should the water level within the tank rise above the position shown in the drawings to a height sufficient to float the ball 174, the ball 174 will effect actuation of the valve 167 through the link 173 and the rod 176 to open the valve and relieve the water overflow in the tank through the drain pipes 31 and 32. Should the pressure within the system rise above a desired optimum, the tank 150 will be automatically relieved of such pressure by the automatic pop-off of the valve 167 from its seat 166 to accommodate drainage of any water within the tank outside of the cylindrical offset 159 and to accommodate relief of pressure within the system. The point of automatic pressure blow-off is automatically determined by the strength or adjustment of the spring 168 holding the valve 167 to its seat 166.

Should the water level within the tank fall below a desired optimum, or when the tank is being drained, the valve 181 will be effective to prevent the occurrence of vacuum pressure within the system, since the same will be automatically opened upon occurrence of the float ball 208 falling below the position P–2. Accordingly, it will be apparent that the embodiment of the invention shown in Figure 4 accomplishes all of the results and advantages of the embodiment of the invention shown in Figure 3, with the exception that the controls are accomplished in the embodiment shown in Figure 4 by means of two floats rather than by a single float as disclosed in Figure 3.

A further embodiment of the invention is shown in Figure 5, the arrangement being substantially the same as that shown in Figure 3, with the exception that a different linkage and modified valve constructions are provided. Due to the similarity between the two embodiments, the corresponding reference numerals in the 200 and 300 series will be utilized to describe and indicate parts similar or identical to parts of the embodiment of the invention shown in Figure 3.

The expansion or surge tank of the embodiment of the invention shown in Figure 5 includes a cylindrical shell 240, which is preferably of cup-shape substantially identical to the cylindrical shell 40 of the embodiment of the invention shown in Figure 3. The shell 240 is provided with an end plate 243 secured to a flange at the end of the shell 240 in a suitable manner. The end plate 243 is provided with a number of apertures including an upper aperture 244 adapted for the reception of an air valve 245, a central aperture 246 adapted for the reception of a switch mechanism 247 and a lower aperture 248 adapted for the reception of a combination pressure relief and overflow valve 249. The switch 247 is preferably identical to the switch 47 previously described. The switch mechanism 247, as the switch mechanism 47, is provided with a sylphon 276 establishing a sealed pivotal connection for a switch actuator rod 277. The air valve 245 is substantially identical to the pressure relief and overflow valve 249 except that same is in an inverted position.

The valve 249 comprises a body member 300 provided with an integral external flange 301 by means of which the valve may be suitably secured to the end plate 243, as by rivets 302 or the like. The body member 300 is provided with an integral internal flange 303 having an inclined surface forming a valve seat. The body member 300 is also provided with an integral cap-like portion 304 extending into the interior of the shell 240. A cylindrical valve member 305 is reciprocally mounted within the body member 300 and has its cylindrical portion guided within the body member by means of the internal flange 303. The valve member 305 is provided with an integral external flange 306 extending outwardly to present a surface opposed to the inclined surface of the flange 303 of the body member 300. An annular groove, generally V-shaped in cross section, is provided in the face of the flange 306 opposed to the inclined surface of the flange 303. The annular groove in the valve member 305 is adapted for the reception of an annular O ring 307 arranged to effect a seal between the valve member and its seat. Breather ports are preferably provided in the flange 306 to insure proper seating of the O ring seal. The valve member 305 is provided with an integral extension 308 projecting to the exterior of the shell 240. A plurality of holes 309 are provided in the cylindrical portion of the valve 305 to establish communication between the interior of the shell and the exterior thereof when the valve 305 is moved to open position. An axial bore 310 is provided in the stem 308 of the valve member 305 for the slidable reception of one end of a rod 311. The rod 311 is bifurcated at its opposite end, as at 312, for a purpose to be described hereinafter. A fitting or end cap 313 is suitably secured to the body member 300 and a spring 314 is suitably compressed between the end cap 313 and the flange 306 of the valve member 305 to normally urge the valve to closed position. The end cap 313 is provided with a guide 315 adapted for the slidable reception of the valve stem 308 for guiding same for reciprocal movement with respect to its seat 303. A suitable outlet connection for establishing communication with the drain pipes 31 and 32 is provided on the body member 300.

As in the embodiment of the invention shown in Figure 3, the valve and the switch mechanism are under the control of a suitable flow responsive linkage 320 and the control is effected by means of a single float. The linkage 320 includes a rod 322 extending from the float ball and bifurcated at the end thereof opposite the float ball for pivotal connection to a support 323 which is suitably secured to the end plate 243 by means of rivets 324 or the like. A link 325 is operatively associated with the rod 322 by means of a slot 326 in the link 325 adapted to slidably receive a pin 327 secured to the rod 322. At its lower end, the link 325 is pivotally connected to a bell crank 328 which is pivotally supported on the end-cap portion 304 of the valve 249. The opposite end of the bell crank 328 is pivotally connected to the bifurcated portion 312 of the valve stem of the valve actuator rod 311. The slot 326 is so disposed in the link 325 with regard to the pin 327 on the rod 322 that an upward movement will be imparted to the link 325 only when the liquid level within the tank rises above a predetermined maximum, upon occurrence of which the link 325 will pivot the bell crank 328 to cause the rod 311 to push the valve 305 off its seat.

As in the previously described pressure relief and overflow valves 49 and 162, the valve member 305 opens outwardly of the tank so as to provide an automatic pop-off feature upon occurrence of pressures greater than desired within the interior of the tank. In the present embodiment of the invention, the air valve 245 is identical to the pressure relief valve 249, so that the valve 245 may also, or alternately, serve as a pressure relief valve. The determination of the exact pressure relief condition will depend upon the strength or adjustment of the springs 314 of the individual valves. For example, if the spring in the valve 245 were stronger than the spring in the valve 249, the valve 249 would serve to relieve pressures within the tank. However, if the spring in the valve 245 exerted less pressure than the spring in the valve 249, then the valve 245 would serve as an automatic pressure relief valve, but would not accomplish the automatic drain of the expansion tank as would the valve 249. If the springs of the valves 245 and 249 exert the same force on the valves, then the two valves would cooperate in relieving pressures within the tank. Anyone of these three relationships can be utilized as desired.

The valve 245 is under the control of a link 335 operatively associated with the float rod 322 by means of a slot 336 in the link 335 and a pin 337 secured to the rod 322. At its upper end, the rod 335 is pivotally connected to a bell crank 338, which is the same as the bell crank 328, to effect actuation of the valve 245 by opening same outwardly. The arrangement of the slot 336 in the link 335 with respect to the pin 337 on the rod 322 is such that the valve 245 will be automatically opened when the water level within the tank falls below a predetermined minimum level. In all other positions of the float ball, however, the valve will be relieved of the mechanical force exerted by the ball so that same is operable independently thereof depending upon the pressures exerted thereon by the fluid or air within the tank and the valve spring.

A third link 330 is pivotally connected at its upper end to the bell crank 338 of the valve 245 and its lower end is pivotally connected to the switch actuator rod 277. Accordingly, in the present embodiment of the invention, the switch mechanism 247 will be operated in accordance with the float actuation of the valve 245.

Due to the slidable association of the float operated mechanism with the valves 245 and 249 and likewise of the valves 49 and 162, movement of the bell cranks or other mechanisms, utilized to actuate the valves through the float or floats, in a direction opposite to the normal direction of actuation of the valves, will not result in any detrimental effect.

In operation, the embodiment of the invention shown in Figure 5 has substantially the same operation as the embodiment of the invention shown in Figure 3, and, as will be apparent, performs substantially the same functions as does the embodiment of the invention shown in Figure 4.

Referring now to Figure 1, I have shown suitable electric circuit control means for the furnace and the expansion tank associated with the furnace. As shown, the circuit is powered from the standard household 115 volt alternating current source and includes a manually operable switch 350 for energizing and deenergizing the circuit. One side of the power source is connected through the switch 350 directly to the switch associated with the expansion tank. In Figure 1, I have shown the Figure 3 embodiment of the expansion tank of the present invention as associated with the furnace. However, it will be appreciated that the control circuit is applicable to all embodiments of the expansion tank. For example, in the Figure 3 and Figure 5 embodiments, the direct lead from the power source is connected to the central or common contact of the switches 47 and 247, respectively, and, in the Figure 4 embodiment, is connected to one contact of each of the two switches of the switch mechanism 183. The other side of the power source is connected to the solenoid feeder valve 15, and to a conventional furnace burner control 351. Suitable leads are provided from the switch mechanism (47, 183, 247) to the feeder valve 15, and the burner control 351. As indicated in Figure 1, one contact of the switch (47, 247), (or one contact of one of the switches in the switch mechanism 183), namely that contact engaged with the directly connected contact of the switch when the water level falls below a predetermined minimum, is connected with the solenoid valve and the other contact (or one contact of the other switch in the switch mechanism 183) is connected to the burner control 351. Thus, it will be apparent, from the foregoing description of the various embodiments of the expansion tank of the present invention, that when the water level falls below a predetermined minimum, the burner control 351 is disconnected to render the furnace inoperative, that when the water level is at or above the said predetermined minimum the burner control 351 is connected in the circuit to control operation of the furnace, that when the water level is below a predetermined minimum the feeder valve 15 is opened, and that when the water level is above the said last-named minimum the feeder valve is deenergized and closed.

In view of the foregoing, it will be apparent that in all embodiments of the invention, five controls are effected upon the heating system, which controls provide for complete and automatic operation of the heating system. The present invention provides correlated control means for water-heating systems which guarantee completely safe and most efficient operation of the heating system. The invention further provides novel valve means for effecting the controls defined.

While I have described what I regard to be preferred embodiments of my invention, it will be apparent that various changes, rearrangements and modifications can be made therein without departing from the scope of my invention, as defined by the appended claims.

I claim:

1. A hot water heating system comprising a boiler, a plurality of radiators, conduit means connecting said boiler and said radiators, conduit means comprising a fluid inlet to said boiler and said radiators, and an expansion tank connected to said boiler and said radiators and being located at the highest point of the system, said expansion tank including an outlet, a valve normally closing said outlet and water level responsive means for actuating said valve, said water level responsive means upon attainment of a predetermined high water level within said tank actuating said valve to relieve the system of excess water, said valve opening in the outlet direction with respect to said tank and having operative association with said water level responsive means and being resiliently urged and normally retained in closed position, said valve being actuated upon occurence of pressure in said tank above a predetermined maximum against the normal resilient urge thereon to vent the system of excess pressure.

2. A hot water heating system comprising a boiler, a plurality of radiators, conduit means connecting said boiler and said radiators, conduit means comprising a fluid inlet to said boiler and said radiators, a solenoid valve in said last-named conduit means controlling flow therethrough, electric control means for said boiler, an expansion tank connected to said boiler and said radiators and being located at the highest point in the system, said expansion tank including water level responsive means for controlling electric circuit means, within which said boiler control means and said solenoid valve are connected, to maintain the water level in the system at a desired level and to control said boiler in accordance with the water level in the system, and valve means in said tank operatively associated with said water level responsive means to prevent vacuum, overpressure and excess water conditions.

3. A hot water heating system comprising a boiler, a plurality of radiators, conduit means connecting said boiler and said radiators, conduit means comprising a fluid inlet to said boiler and said radiators, a solenoid valve in said last-named conduit means controlling flow therethrough, electric control means for said boiler, and an expansion tank connected to said boiler and said radiators and being located at the highest point of the system, said expansion tank including water level responsive means for controlling electric circuit means within which said boiler control means and said solenoid valve are connected normally to maintain the water level in the system at a desired level and to control said boiler in accordance with water level in the system, a first valve operatively associated with said water level responsive means, said first valve being opened by said water level responsive means upon occurrence of a water level within said tank below a predetermined minimum to vent said tank to prevent occurrence of vacuum pressure within the system, said first valve being moved to closed position upon occurrence of water levels within said tank in excess of said predetermined minimum to close said tank to maintain a pressure head upon the water within the system, and a second valve operatively associated with said water level responsive means, said second valve being actuated by said water level responsive means upon occurrence of water levels in excess of a predetermined maximum resulting from failure of said electric circuit means and excessive expansion of the water in the system to relieve the system of excess water, said second valve being resiliently urged to closed position and being opened automatically upon occurrence of pressures within the tank in excess of a predetermined maximum to vent the system of excessive pressures.

4. An expansion tank comprising a casing having an inlet and an outlet, a valve normally closing said outlet, resilient means biasing said valve to closed position with predetermined force, liquid level responsive means in said casing, and a linkage connecting said means to said valve, said inlet being connectable to a source of liquid, said liquid level responsive means upon occurrence of a predetermined liquid level in said casing actuating said linkage positively to move said valve to open position to vent said casing of excess liquid independently of the fluid pressure therein, said valve being exposed to the interior of said casing and being responsive to pressure therein to be opened upon occurrence of pressures in said casing in excess of said predetermined force, said linkage having one-way connection with said valve and engaging the same in the direction to open the valve, said connection accommodating opening movement of said valve independently of said linkage and said means, whereby said valve is responsive to fluid pressures in said casing independently of the liquid level therein.

5. An expansion tank comprising a casing having an inlet and a pair of outlets, one of said outlets being spaced substantially above the bottom of said casing and the other being positioned adjacent the bottom of said casing, a first valve adapted to close said one outlet, float controlled means in said casing adapted to actuate said first valve, a second valve adapted to close said other outlet, resilient means urging said second valve to close said other outlet, said float controlled means being adapted upon occurrence of liquid levels in said casing below a predetermined minimum to open said first valve to prevent the occurrence of vacuum pressures within said casing, said second valve being adapted to be opened upon occurrence of pressures within said casing in excess of a predetermined maximum automatically to relieve said casing of excessive pressures.

6. An expansion tank comprising a casing having an inlet and a pair of outlets, conduit means establishing communication between said inlet and a source of liquid, one of said outlets being spaced substantially above the bottom of said casing and the other being positioned adjacent the bottom of said casing, a first valve adapted to close said one outlet, first float controlled means in said casing operatively associated with said first valve, a second valve adapted to close said other outlet, and second float controlled means in said casing operatively associated with said second valve, said first float controlled means being adapted upon occurrence of liquid levels in the said casing below a predetermined minimum to open said first valve to vent said casing to prevent the occurrence of vacuum pressures in said casing, said first valve being adapted to close said one outlet when liquid level in said casing is in excess of said predetermined minimum to maintain a pressure head in said casing, said second float controlled means being adapted to actuate said second valve upon occurrence of water levels in said casing in excess of a predetermined maximum to relieve said casing of excessive liquid.

7. An expansion tank adapted for use in a water heating system having a furnace operated under electrical controls and a water inlet controlled by a solenoid valve, comprising a casing having an inlet in communication with the outlet of the solenoid valve, water level responsive means positioned in said casing, an actuator rod operatively associated with said water level responsive means extending through one wall of said casing to the exterior thereof, a switch mechanism positioned exteriorly of said casing and operatively associated with said actuator rod, said switch mechanism being included in the circuits of the electrical controls for the boiler and the solenoid valve, said switch mechanism being adapted under control of said water level responsive means to effect control of the boiler operation and solenoid operation in response to variations in water level within said casing, said switch mechanism upon the occurrence of water levels below a predetermined minimum energizing the solenoid valve and deenergizing the boiler controls and upon occurrence of water levels in excess of said predetermined minimum deenergizing the solenoid valve and energizing the boiler controls, said casing including an outlet, a valve adapted to close said outlet, and float controlled means in said casing operatively associated with said valve, said float controlled means upon occurrence of liquid levels in said casing lower than a predetermined minimum actuating said valve to vent said casing to prevent the occurrence of vacuum pressures in said casing, said valve closing said outlet upon occurrence of liquid levels in said casing in excess of said predetermined minimum to maintain a pressure head on the liquid in said casing.

8. An expansion tank comprising a casing having an inlet and a pair of outlets, conduit means establishing communication between said inlet and a source of liquid, one of said outlets being spaced substantially above the bottom of said casing and the other being positioned adjacent the bottom of said casing, a first valve adapted to close said one outlet, a second valve adapted to close said other outlet, float controlled means in said casing operatively associated with said valves, said float controlled means being adapted upon occurrence of liquid levels in said casing below a predetermined minimum to open said first valve to vent said casing to prevent occurrence of vacuum pressures in said casing, said first valve being adapted to close said one outlet upon occurrence of liquid levels in said casing in excess of said predetermined minimum to maintain a pressure head on the liquid in said casing, said float controlled means being adapted to actuate said second valve upon occurrence of liquid levels in said casing in excess of a predetermined maximum to relieve said casing of excess liquid, said second valve being adapted to be closed by said resilient means when liquid level in said casing is less than said predetermined maximum, said second valve being adapted to be automatically opened against the urge of said resilient means upon occurrence of pressures in said casing in excess of a predetermined maximum to automatically vent said chamber of excess pressure, said second valve when opened accommodating discharge of liquid from said casing.

9. An expansion tank adapted for use in a water heating system having a furnace operated under electrical control and a water inlet controlled by a solenoid valve, comprising a casing having an inlet in communication with the outlet of the solenoid valve, water level responsive means positioned in said casing, an actuator rod operatively associated with said water level responsive means extending through one wall of said casing to the exterior thereof, and a switch mechanism positioned exteriorly of said casing and being operatively associated with said actuator rod, said switch mechanism being included in the circuits of the electrical controls for the furnace and the solenoid valve, said switch mechanism being adapted under control of said water level responsive means to effect control of the furnace operation and solenoid operation in response to variations in water level within said casing by energizing the solenoid valve and deenergizing the furnace controls upon occurrence of a predetermined minimum water level and by deenergizing the solenoid valve and energizing the furnace controls upon occurrence of water levels in excess of said predetermined minimum, said casing having an outlet, a valve adapted to close said outlet, resilient means urging said valve to normally close said outlet, and float controlled means in said casing operatively associated with said valve, said float controlled means being adapted upon occurrence of water level in said casing in excess of a pretdermined maximum to actuate said valve to relieve said casing of excess water, said valve being adapted to be opened automatically against the urge of said resilient means upon occurrence of pressures in said casing in excess of a predetermined maximum to vent said casing of excessive pressures.

10. An expansion tank adapted for use in a water heating system having a furnace operated under electrical control and a water inlet controlled by a solenoid valve, comprising a casing having an inlet in communication with the outlet of the solenoid valve, water level responsive means positioned in said casing, an actuator rod operatively associated with said water level responsive means extending through one wall of said casing to the exterior thereof, and a switch mechanism positioned exteriorly of said casing and being operatively associated with said actuator rod, said switch mechanism being included in the circuits of the electrical control for the furnace and the solenoid valve, said switch mechanism being adapted under control of said water level responsive means to effect control of the furnace operation and solenoid operation in response to variations in water level within said casing, said switch mechanism being adapted to be actuated by said water level responsive means upon occurrence of water levels less than a predetermined minimum to energize the solenoid valve and deenergize the furnace controls and upon occurrence of water level in excess of said predetermined minimum to deenergize the solenoid valve and energize the furnace controls, said casing having an outlet, a valve adapted to close said outlet, and resilient means urging said valve to normally close said outlet, said water level responsive means being operatively associated with said valve and being adapted upon occurence of water level in said casing in excess of a predetermined maximum to actuate said valve to relieve said casing of excess water, said valve being adapted to be opened automatically against the urge of said resilient means upon occurrence of pressures in said casing in excess of a predetermined maximum to vent said casing of excessive pressures, said casing having a second outlet, and a second valve adapted to close said second outlet, said water level responsive means being operatively associated with said second valve and being adapted upon occurrence of water level in said casing less than a predetermined minimum to open said valve to vent said casing to prevent the occurrence in said casing of vacuum pressures, said second valve being adapted to close said second outlet upon occurrence of water levels in said casing in excess of said predetermined minimum to maintain a pressure head on the water in said casing.

References Cited in the file of this patent

UNITED STATES PATENTS

| | | |
|---|---|---|
| 508,132 | Gold | Nov. 7, 1893 |
| 570,804 | Hutchinson | Nov. 3, 1896 |
| 635,042 | Goodwin | Oct. 17, 1899 |
| 2,166,235 | Cornell | July 18, 1939 |
| 2,264,793 | Griffiths | Dec. 2, 1941 |
| 2,288,223 | Bomyer | June 30, 1942 |
| 2,399,985 | Chandler | May 7, 1946 |
| 2,570,961 | McBride | Oct. 9, 1951 |
| 2,574,054 | Miller | Nov. 6, 1951 |
| 2,574,851 | Wagner | Nov. 13, 1951 |
| 2,699,760 | Tidd | Jan. 18, 1955 |
| 2,703,074 | Berkenmeier | Mar. 1, 1955 |

FOREIGN PATENTS

| | | |
|---|---|---|
| 443,370 | Great Britain | Feb. 21, 1936 |